Sept. 19, 1961 D. COHN 3,000,136

DOLL'S HEAD AND EYE MOUNTING MEANS THEREFOR

Filed Nov. 26, 1958 3 Sheets-Sheet 1

INVENTOR.
DAVID COHN

BY Clark + Ott

ATTORNEYS

DOLL'S HEAD AND EYE MOUNTING MEANS THEREFOR

Filed Nov. 26, 1958 3 Sheets-Sheet 2

INVENTOR.
DAVID COHN

BY Clark & Ott

ATTORNEYS

DOLL'S HEAD AND EYE MOUNTING MEANS THEREFOR

Filed Nov. 26, 1958

INVENTOR.
DAVID COHN
BY Clark & Ott
ATTORNEYS

3,000,136
DOLL'S HEAD AND EYE MOUNTING MEANS THEREFOR

David Cohn, Poundridge, N.Y., assignor to Model Plastic Corporation, White Plains, N.Y., a corporation of New York Filed Nov. 26, 1958, Ser. No. 776,544
2 Claims. (Cl. 46—169)

This invention relates to dolls' heads provided with movable eyes and the invention has particular reference to improved mounting means for attaching eye constructions in position at the eye openings.

An object of the invention is to provide a doll's head and an eye construction with interengaging means for conveniently, expeditiously and securely fastening the eye construction in position in the doll's head at an eye opening.

The invention relates to dolls' heads provided with lips or rims extending inwardly from the front wall of the head at the edge of the eye openings and which provide means for attaching eye constructions to the doll's head and to form sockets for receiving the eye constructions. The eye constructions include eye members pivotally mounted in shells for movement of the eye members at openings in the forward portions of the shells and which shells are of arcuate formation in section to snugly fit the sockets formed by the peripheral rims. Another object of the invention, therefore, is to provide mounting means for attaching the eye constructions to the inwardly directed rims at the eye openings and which attaching means function to retain the eye constructions in registry with the eye openings respectively.

Another object of the invention is to provide attaching means having tongues adapted to be readily clamped on the peripheral rims for attaching the eye constructions to the doll's head with the eye constructions retained in position at the eye openings.

Another object of the invention is to provide an eye construction of said character having a rearwardly projecting lug which is received in an opening in the attaching means for retaining the eye construction in alignment with the eye opening.

Still another object of the invention is to provide attaching means in the form of a housing having downturned forward ends for clampingly engaging the peripheral rims at the eye openings.

Still another object of the invention is to provide a housing of said character having interlocking means for preventing accidental or unintentional release of the housing from the peripheral rims at the eye openings.

With the foregoing and other objects in view, reference is now made to the following specification and accompanying drawings in which the preferred embodiments of the invention are illustrated.

Figures 1, 2, 3, 5:
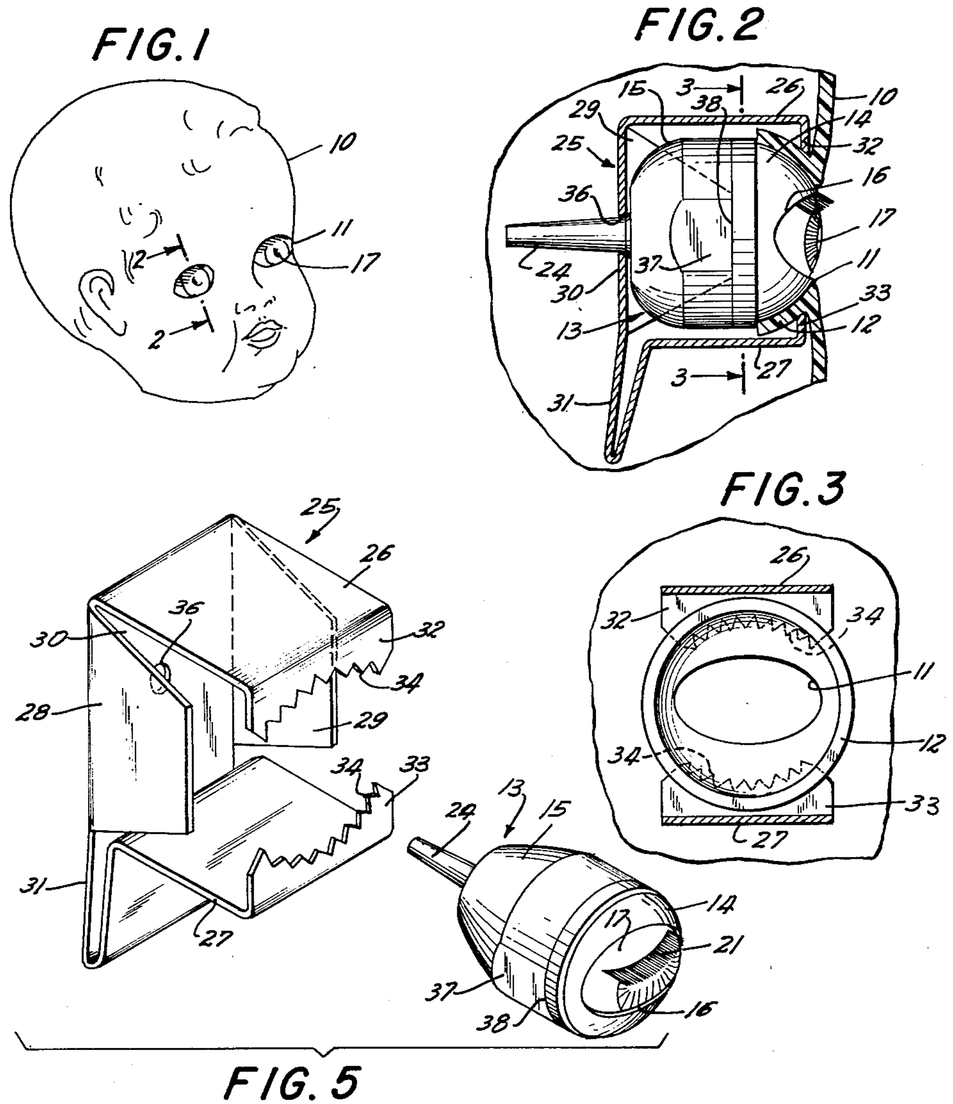
FIG. 1 is a perspective view of a doll's head provided with the improved means for attaching the eye constructions to the doll's head.
FIG. 2 is an enlarged vertical sectional view taken approximately on line 2—2 of FIG. 1.
FIG. 3 is a fragmentary sectional view taken approximately on line 3—3 of FIG. 2.
FIG. 5 is a perspective view of one of the eye constructions and attaching means therefor shown in separated juxtaposition.
Figure 4:
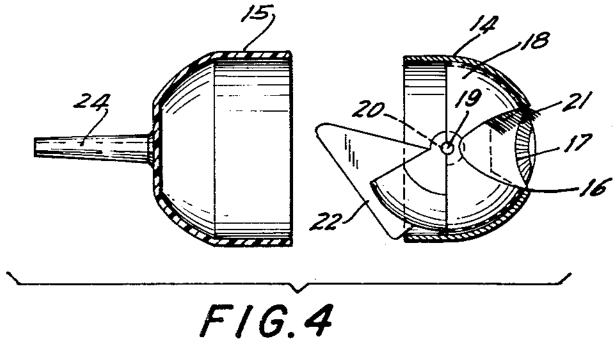
FIG. 4 is a vertical sectional view through one of the eye constructions.

Referring to the drawings and more particularly to the form of the invention shown in FIGS. 1 to 5 inclusive thereof, the doll's head 10 is provided with the usual eye openings 11 and extending inwardly from the peripheral edge portions of the eye openings are annular lips or rims 12 of arcuate formation in section forming substantially semi-spherical sockets within the head and with the eye openings 11 located substantially at the centers thereof respectively. The lips or rims 12 are integrally formed with the doll's head which may be of thermoplastic material which flows with heat and pressure as set forth in the application Serial No. 766,544, filed November 10, 1958. The lips or rims being integrally formed with the head function to reinforce the doll in the region of the eye openings and provide means by which eye constructions 13 may be secured thereto so as to dispose the eye constructions in the sockets and with eye members located at the eye openings respectively.

Each of the eye constructions 13 includes a casing or shell composed of front and rear sections 14 and 15. The front section 14 is provided with a forward dome shaped portion having an opening 16 at the center thereof of elliptical formation and with an eye member 17 pivotally mounted within said section and affixed to a substantially semi-spherical shell 18. The shell 18 has pintles 19 which are pivoted at their ends in openings 20 in the side walls of said section 14. Above the eye member the shell is provided with eyelashes 21 and the shell is colored to simulate an eyelid above the eyelashes. Affixed to the shell 18 is a weight 22 which provides a counterbalance for the eye member and shell. The section 14 telescopically fits the section 15 to retain the sections in assembled relation. The section 15 is formed with a tubular lug 24 which projects axially from the rear wall thereof and is disposed on an axis extending centrally through the eye member 17 and the sections 14 and 15. The said lug is of tapered formation and provides means for centralizing the eye construction with reference to the eye opening 11 in the doll's head as well as providing means of connection for joining the same with a conduit (not shown) for admitting liquid to the eye construction for discharge therefrom in the form of tears.

Attaching means is provided for conveniently and expeditiously securing the eye constructions to the lips or rims 12 of the doll's head. As illustrated in this form of the invention, the attaching means in the form of a housing 25 is for a single eye construction and which retains the same in alignment with the opening. The housing includes top and bottom walls 26 and 27, opposite side walls 28 and 29, a rear wall 30 and a rebent portion 31 connecting the rear wall with the bottom wall 27. The top and bottom walls 26 and 27 are formed with inwardly directed tongues 32 and 33 having serrated inner edges 34 of arcuate formation conforming substantially to the arcuate formation of the lips or rims 12 and which tongues 32 and 33 are adapted to engage over the top and bottom portions of a lip or rim and to be embedded therein by the tightening of the walls of the rebent portion 31 into close relation as shown in FIG. 2 of the drawings. This forces the tongues 32 and 33 inwardly into rigid clamping relation with the lip or rim. The rear wall 30 is provided with an opening 36 through which the tubular lug 24 projects so as to retain the eye construction in axial alignment with the opening 11. The side walls 28 and 29 clampingly engage against the flattened side faces 37 provided on opposite sides of the eye construction with the end edges of the side walls 28 and 29 disposed in abutting engagement with the shoulders 38 at the outer ends of said flattened faces.

The housing 25 is produced from sheet metal which is cut and bent to provide the aforesaid integral construction.

Figures 6, 7, 8, 9, 10, 11:
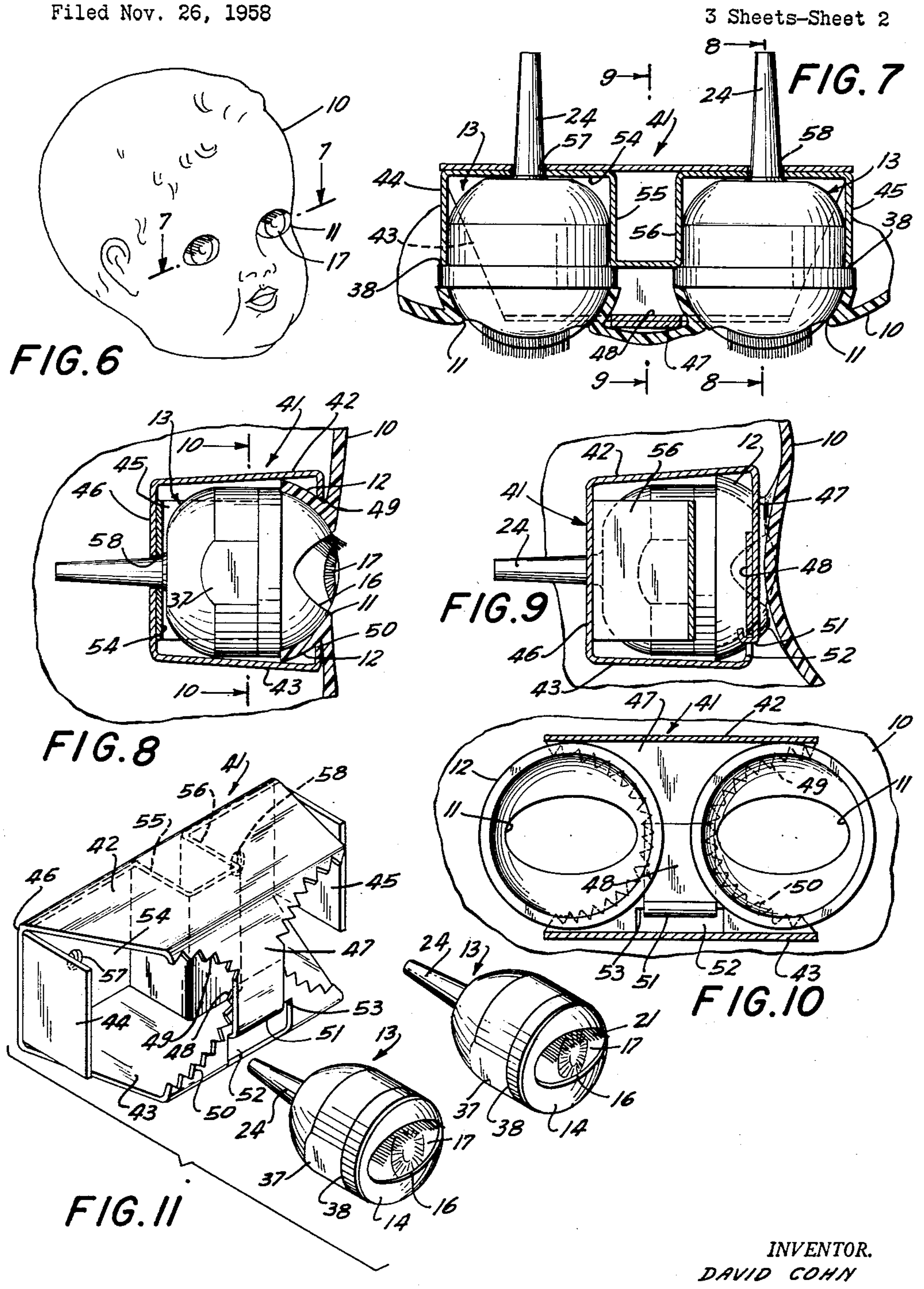
FIG. 6 is a perspective view of a doll's head provided with a modified form of the improved means for attaching two eye constructions in position at the eye openings.
FIG. 7 is an enlarged sectional view taken approximately on line 7—7 of FIG. 6.
FIG. 8 is a sectional view taken approximately on line 8—8 of FIG. 7.
FIG. 9 is a similar view taken approximately on line 9—9 of FIG. 7.
FIG. 10 is a sectional view taken approximately on line 10—10 of FIG. 8.
FIG. 11 is a perspective view of the eye constructions for the right and left eyes and attaching means therefor shown in separated juxtaposition.
Figure 12:
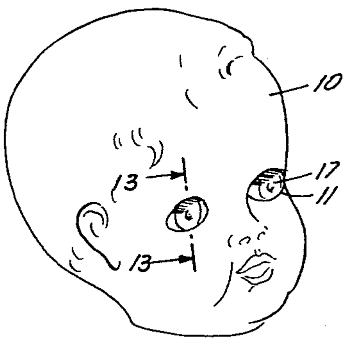
FIG. 12 is a perspective view of a doll's head provided with a further modified form of the improved means for attaching an eye construction in position at an eye opening.

In the form of the invention shown in FIGS. 6 to 11 inclusive of the drawings, an attaching means 41 is provided for receiving two eye constructions 13 and for retaining the same in position at the eye openings 11 of the doll's head 10. The attaching means is in the form of a housing 41 and consists of top and bottom walls 42 and 43, opposite side walls 44 and 45 and a rear wall 46. The top and bottom walls 42 and 43 are formed with inwardly directed tongues 47 and 48 having serrated inner edges 49 and 50 respectively which are of arcuate formation conforming substantially to the arcuate formation of the lips or rims 12 of the doll's head. The side walls 44 and 45 are adapted to extend over the top and bottom portions of the lips or rims 12 with the inner edges 49 and 50 of the tongues 47 and 48 embedded therein so as to securely fasten the attaching means thereto and with the two eye constructions in registry with the right and left eye openings respectively. The tongue 47 extends downwardly into overextending relation with the tongue 48 and is formed with a hooked end 51 which extends through an opening 52 in the tongue 48 and hooks over the upper edge 53 thereof to lock the tongues 47 and 48 in attached relation on the lips or rims 12 as shown in FIGS. 9 and 10 of the drawings.

The housing 41 is formed of sheet metal, the top and bottom walls 42 and 43 being formed integrally with the rear wall 46 while the side walls 44 and 45 are formed integrally with a plate 54 which overlies the rear wall 46 and is bent forwardly so as to form interior side walls 55 and 56 which are arranged in oppositely disposed relation to the side walls 44 and 45 respectively. One of the eye constructions is arranged between the side walls 44 and 55 and the other is arranged between the side walls 45 and 56 and which side walls flatly engage against the flattened sides of the eye construction and with the ends of said side walls abutting against the shoulders 38. The tubular lug 24 of said eye construction protrudes through aligned openings 57 in the rear wall 46 and plate 54 for retaining said eye construction in alignment with the right eye opening 11 of the doll's head 10. The other eye construction is retained in position between the side walls 45 and 56 which flatly engage against the flattened portions 37 of said eye construction and with the ends of said walls thereof abutting against the shoulders 38. The tubular lug 24 protrudes through aligned openings 58 in the rear wall 46 and plate 54.

In the form of the invention shown in FIGS. 12 to 16 inclusive of the drawings, the attaching means in the form of a housing 60 is similar to the housing 25 but in this form of the invention the housing 60 does not include the rebent portion 31. As illustrated, the housing 60 is produced from sheet metal and includes top and bottom walls 61 and 62, oppositely disposed side walls 63 and 64 formed integrally with a rear wall 65, the top and bottom walls having inwardly directed fingers 66 provided with serrated edges 67. The top and bottom walls are adapted to extend over the lip or rim 12 surrounding an eye opening 11 of the doll's head 10 and with the inwardly directed tongues clamped into tight engagement thereon to fixedly secure the housing to the doll's head and with an eye construction disposed in axial alignment with an eye opening 11. The tubular lug 24 of the eye construction fittingly engages an opening 68 in the rear wall of the housing so as to retain the eye construction in axial alignment with the eye opening. The side walls of the housing tightly engage against the flattened side faces 37 of the eye construction and with the ends of said side walls disposed in abutting engagement against the shoulders 38 to thereby retain the eye construction in forward position snugly fitting the sockets formed by the peripheral rim 12. It will be understood that a housing 60 is provided for each eye opening which permits of expeditiously and conveniently securing the eye constructions in position at the eye openings.

Figure 13:
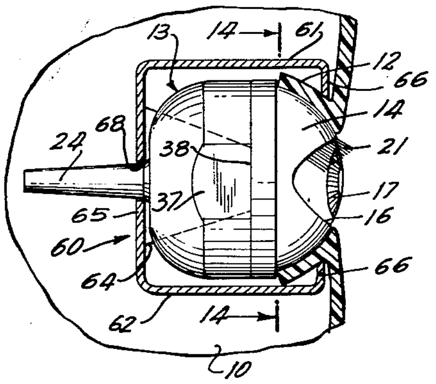
FIG. 13 is an enlarged sectional view taken approximately on line 13—13 of FIG. 12.
Figures 14, 16:
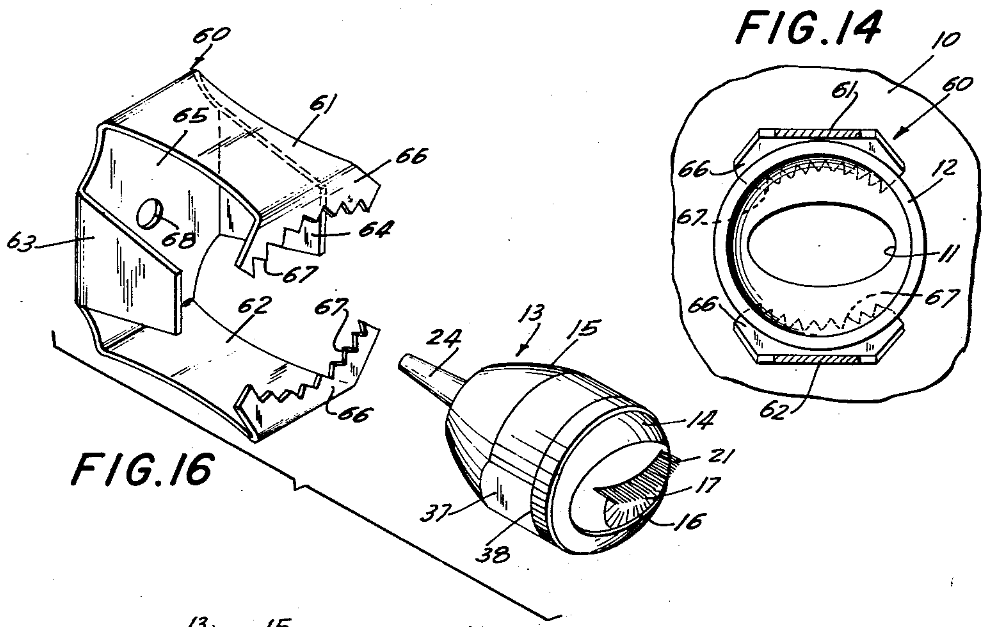
FIG. 14 is a sectional view taken approximately on line 14—14 of FIG. 13.
FIG. 16 is a perspective view of an eye construction and attaching means therefor shown in separated juxtaposition.
Figure 15:
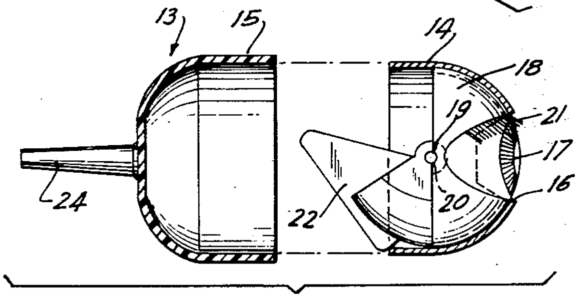
FIG. 15 is a sectional view taken through the eye construction.

It will be understood that the housings in the three forms of the invention being made of relatively stiff sheet material may be conveniently affixed to the lips or rims 12 of the doll's head by forcing the top and bottom walls of the housing inwardly as shown in section in FIGS. 2, 6 and 13 of the drawings. In the form shown in FIGS. 1 to 5 inclusive of the drawings, the top and bottom walls 26 and 27 of the housings may be forced inwardly into clamping relation on the lips or rims 12 by forcing the walls of the rebent portion 31 of each housing into adjacent relation as shown in FIG. 2 of the drawings. In the form shown in FIGS. 6 to 11 of the drawings, the hooked end 51 of the tongue 47 snaps into the opening 52 in the tongue 48 and latches over the upper edge of said opening when the top and bottom walls 42 and 43 are forced downwardly into clamping relation on the lips or rims 12 to thereby retain the same in clamping relation thereon.

While the preferred forms of the invention have been shown and described herein, it is to be understood that the same is not so limited but shall cover and include any and all modifications thereof which fall within the purview of the invention.

What is claimed is:

1. An eye mounting means for a doll's head having an eye opening and a curved lip formed integrally with the head and extending inwardly from the front wall thereof continuously about said eye opening and forming a socket within the head with the eye opening located substantially centrally thereof, said eye mounting means including an eye construction comprising a shell having an eye opening and an eye member disposed at said opening and pivotally mounted within said shell for relative movement with reference to said eye opening, said shell having a curved forward portion adapted to fit said socket and having flattened opposite sides and a shoulder at the forward end of each of said flattened sides, a housing having a rear wall and oppositely disposed tongues extending forwardly from said rear wall having inwardly directed sharpened portions at the forward ends thereof adapted to be clamped on said lip, said housing having side tongues extending forwardly from said rear wall between which said eye construction is secured with said side tongues clampingly engaged against the flattened side faces of said eye construction and with the ends of said side tongues disposed in abutting engagement with said shoulders, and said housing including a U shaped extension connected between said rear wall and one of said tongues having said inwardly directed sharpened portions, said U shaped extension being disposed in angular relation with said one tongue and with the opposite portions of said extension being spaced apart and adapted to be compressed into closer relation to thereby bend said one tongue inwardly for securing said inwardly directed sharpened portions of said oppositely disposed tongues in clamping engagement on said lip with the curved forward portion of said eye construction disposed in said socket.

2. An eye mounting means for a doll's head as set forth in claim 1 in which the housing is provided with an opening in the rear wall thereof and the shell is provided with a conical shaped tubular extension disposed in protruding relation through said opening for retaining the eye construction in alignment with the eye opening in the doll's head.

References Cited in the file of this patent

UNITED STATES PATENTS

| | | |
|---|---|---|
| 2,143,029 | Popvich | Jan. 10, 1939 |
| 2,696,064 | Wolfe et al. | Dec. 7, 1954 |
| 2,819,560 | Cohn | Jan. 14, 1958 |
| 2,856,730 | Bashover | Oct. 21, 1958 |